United States Patent
Tian et al.

(10) Patent No.: US 8,930,501 B2
(45) Date of Patent: Jan. 6, 2015

(54) DISTRIBUTED DATA STORAGE SYSTEM AND METHOD

(71) Applicants: Ming Tian, Shenzhen (CN); Jun Shu, Shenzhen (CN); Weihua Chen, Shenzhen (CN); Sihua Zhuang, Shenzhen (CN); Huan Xiong, Shenzhen (CN)

(72) Inventors: Ming Tian, Shenzhen (CN); Jun Shu, Shenzhen (CN); Weihua Chen, Shenzhen (CN); Sihua Zhuang, Shenzhen (CN); Huan Xiong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 347 days.

(21) Appl. No.: 13/632,427

(22) Filed: Oct. 1, 2012

(65) Prior Publication Data
US 2013/0031221 A1 Jan. 31, 2013

Related U.S. Application Data

(63) Continuation of application No. PCT/CN2011/079879, filed on Sep. 20, 2011.

(30) Foreign Application Priority Data

Sep. 21, 2010 (CN) .......................... 2010 1 0291566

(51) Int. Cl.
*G06F 15/16* (2006.01)
*G06F 3/06* (2006.01)
*H04L 29/08* (2006.01)

(52) U.S. Cl.
CPC ............ *G06F 3/0689* (2013.01); *G06F 3/0605* (2013.01); *G06F 3/0631* (2013.01); *H04L 67/1097* (2013.01)
USPC ............................ 709/219; 709/203; 709/217

(58) Field of Classification Search
CPC ............ G06F 11/1461; G06F 11/1469; G06F 11/1471; H04L 67/1097
USPC ......... 709/203, 217, 219, 223, 226, 228, 238, 709/248; 707/769; 710/5; 711/162; 714/5, 714/8; 719/328; 370/382
See application file for complete search history.

(56) References Cited

U.S. PATENT DOCUMENTS 7,239,581 B2 * 7/2007 Delgado et al. .................. 368/10
7,272,666 B2 * 9/2007 Rowan et al. ..................... 710/5

(Continued)

FOREIGN PATENT DOCUMENTS

| CN | 101047610 | 10/2007 |
| CN | 101075864 | 11/2007 |
| CN | 101340327 | 1/2009 |

OTHER PUBLICATIONS

International Search Report for PCT/CN2011/079879 dated Dec. 29, 2011.

*Primary Examiner* — Quang N Nguyen
(74) *Attorney, Agent, or Firm* — Marshall, Gerstein & Borun LLP

(57) ABSTRACT

A distributed data storage system and method are disclosed. The distributed data storage system includes: an interface machine process module; at least one service process module; and at least one storage module. The interface machine process module is configured to receive a storage request containing data to be stored from a storage requester and distribute the storage request to one of the at least one service process module; the service process module is configured to receive the storage request from the interface machine process module and assign a storage identifier for the date contained in the storage request; the at least one storage module is configured to store the data according to the storage identifier assigned by the service process module. The distributed data storage system and method of the present invention can provide stable, simple, highly efficient, and low cost mass data storage and read/write services for users.

12 Claims, 4 Drawing Sheets

(56) References Cited

U.S. PATENT DOCUMENTS

| | | | |
|---|---|---|---|
| 7,421,549 B2* | 9/2008 | Watanabe | 711/162 |
| 7,617,318 B2* | 11/2009 | Shiga et al. | 709/228 |
| 2005/0027718 A1 | 2/2005 | Sakaguchi et al. | |
| 2005/0063374 A1* | 3/2005 | Rowan et al. | 370/382 |
| 2005/0066222 A1* | 3/2005 | Rowan et al. | 714/5 |
| 2005/0066228 A1* | 3/2005 | Lai et al. | 714/8 |
| 2009/0019459 A1* | 1/2009 | Rowan et al. | 719/328 |
| 2009/0327306 A1 | 12/2009 | Finger et al. | |
| 2011/0202549 A1* | 8/2011 | Nagahori et al. | 707/769 |

* cited by examiner

DISTRIBUTED DATA STORAGE SYSTEM AND METHOD

CROSS-REFERENCE TO RELATED APPLICATIONS

This is a continuation of International Patent Application No. PCT/CN2011/079879 filed Sep. 20, 2011, which claims the priority benefit of Chinese Patent Application No. CN201010291566.6 filed Sep. 21, 2010, the entire respective disclosure of which are incorporated herein by reference.

TECHNICAL FIELD

The present invention relates to storage technologies, and more particular to a distributed data storage system and method.

BACKGROUND OF THE INVENTION

Users Generate Content (UGC) is a new way users use the internet, i.e., changing from originally giving priority to download to both of download and upload important. For example, community network, Video sharing, blog and so on are the main application forms of the UGC. With the continuous development of the global Internet business, the UGC business is rising, and causes widespread concern in the industry.

Since data is generated by users, mass users give birth to a massive amount of data, and bring a massive amount of reading/writing at the same time. How to store these data, how to provide high concurrent read/write services, are problems necessarily faced in the field.

FIG. 1 shows a system architecture diagram of an existing distributed data storage system, which includes a storage identifier (ID) assignment system (or named as ID number release system) 120 and a data storage system 130.

The storage identifier assignment system 120 is responsible for assigning a storage identifier for data to be stored when a storage requester requests for storing the data. The storage identifier assignment system 120 ensures globally unique of the storage identifiers, and let the storage identifiers have a certain degree of randomness in one or some storage identifier segments (in some number segment ranges), this ensures to some extent the load balancing of the data storage system 130.

The data storage system 130 is responsible for storing data and providing read/write services, and includes an interface machine process module 131, a plurality of service process modules 132 and a plurality of storage modules 133. The interface machine process module is configured to receive read and write requests containing a storage identifier, and distribute the read and write requests to corresponding service process module 132, and shield details of configurations of the service process module 132; each service process module 132 is responsible for data storage in one or some storage identifier segments, and receives a storage request containing the storage identifier sent by the interface machine process module 131, provides read/write services of these data, and responds a successful response to the storage requester 110 after the data is stored successfully; the storage module 133 is configured to store and read/write data according to the instruction of the service process module 132.

FIG. 2 is a schematic flow chart of an existing distributed data storage method.

Referring to FIG. 2, when adding a new data, the above distributed data storage method includes the following steps:

Step 210: the storage identifier assignment system assigns a unique storage identifier for the data to be stored;

Step 220: the storage requester submits a request containing data to the interface machine process module according to the assigned storage identifier;

Step 230: the interface machine process module forwards the storage request to corresponding service process module according to a storage identifier segment which the storage identifier belongs to;

Step 240: the service process module instructs the storage module to store data according to the storage identifier, and responds a successful response to the storage requester.

Moreover, when reading data, the above distributed data storage method can also include the following steps: the storage requester submits a read request containing a storage identifier to the interface machine process module, the interface machine process module distributes the read request to corresponding service process module according to a storage identifier segment which the storage identifier belongs to, the service process module instructs the storage module to return the data to the storage requester according to the storage identifier.

Further, when writing data, the above distributed data storage method can also include the following steps: the storage requester submits a write request containing a storage identifier and content to be modified to the interface machine process module, the interface machine process module distributes the write request to corresponding service process module according to a storage identifier segment which the storage identifier belongs to, the service process module instructs the storage module to write into the modified content.

The above distributed data storage system has the following disadvantages:

1. The coupling is high. The data storage system has dependent relationship with the storage identifier assignment system. First, the storage identifier assignment system needs to ensure the uniformity and of the storage logo and randomness of storage identifiers, once randomness of the storage identifier assignment system is broken, it may result in that one process performed by one service process module is crushed due to a sudden increase of the amount of write requests; when there is single point of failure in the storage identifier assignment system, the storage request of the whole distributed data storage system cannot be completed.
2. The design is complex. Two systems are equally important, in order to guarantee the normal external services, both of the two need a variety of disaster recovery designs.
3. The coupling and the design complexity directly cause an increase of the operation and maintenance costs.
4. There is single point of failure for new requests. When one process performed by one service process module is hung up, the new requests for a storage identifier segment for which the service process module is responsible will fail.
5. The bandwidth cost is increased. Every time new data is added, it is needed to obtain a storage identifier before the actual storage can be performed, there is one interaction more than the direct storage, and the bandwidth cost is doubled.

Thus, a simple, efficient, low-cost storage service model is needed to solve the above technical problem, to provide stable, high concurrent mass data storage and read/write services for users. Such a storage service model will bring significant change in the technical field.

SUMMARY OF THE INVENTION

One embodiment of the present invention provides a distributed data storage system and method, which can provide stable, simple, highly efficient, and low cost mass data storage and read/write services for users.

The technical solution of one embodiment of the present invention is implemented as follows:

A distributed data storage system includes an interface machine process module, at least one service process module and at least one storage module;
  wherein the interface machine process module is configured to receive a storage request containing data to be stored from a storage requester and distribute the storage request to one of the at least one service process module;
  the service process module is configured to receive the storage request from the interface machine process module and assign a storage identifier for the date contained in the storage request;
  the at least one storage module is configured to store the data according to the storage identifier assigned by the service process module.

A distributed data storage method includes:
  receiving, by an interface machine process module, a storage request containing data to be stored from a storage requester, and distributing, by the interface machine process module, the storage request containing data to be stored;
  receiving, by one of at least one service process module, the storage request from the interface machine process module, and assigning, by the one of at least one service process module, a storage identifier for the date contained in the storage request;
  storing, by at least one storage module, the data according to the storage identifier.

It can be seen from the above technical solution, the present invention can avoid utilization of special storage identifier assignment system and avoid that the whole distributed storage system cannot work normally due to failure of the storage identifier assignment system, and can provide simple, highly efficient and low cost storage service for users.

EMBODIMENTS OF THE INVENTION

To make the objectives, technical solution and advantages of the present invention more clear, the present invention is hereinafter described in detail with reference to the accompanying drawings and embodiments.

In a distributed data storage solution of the present invention, a new method for assigning storage identifiers is provided, and a distributed backend service architecture model is designed. In a solution for assigning storage identifiers of the present invention, the storage identifier assignment system is no longer used, instead, each service process module is directly responsible for the assignment of storage identifiers, in this solution, there is no reduction of the service performance, but the overall complexity, coupling and bandwidth cost of the system are greatly reduced.

The above is a general conception of the present invention, exemplary embodiments will be described in details in the following so that those skilled in the art can understand the present invention.

Figure 3:
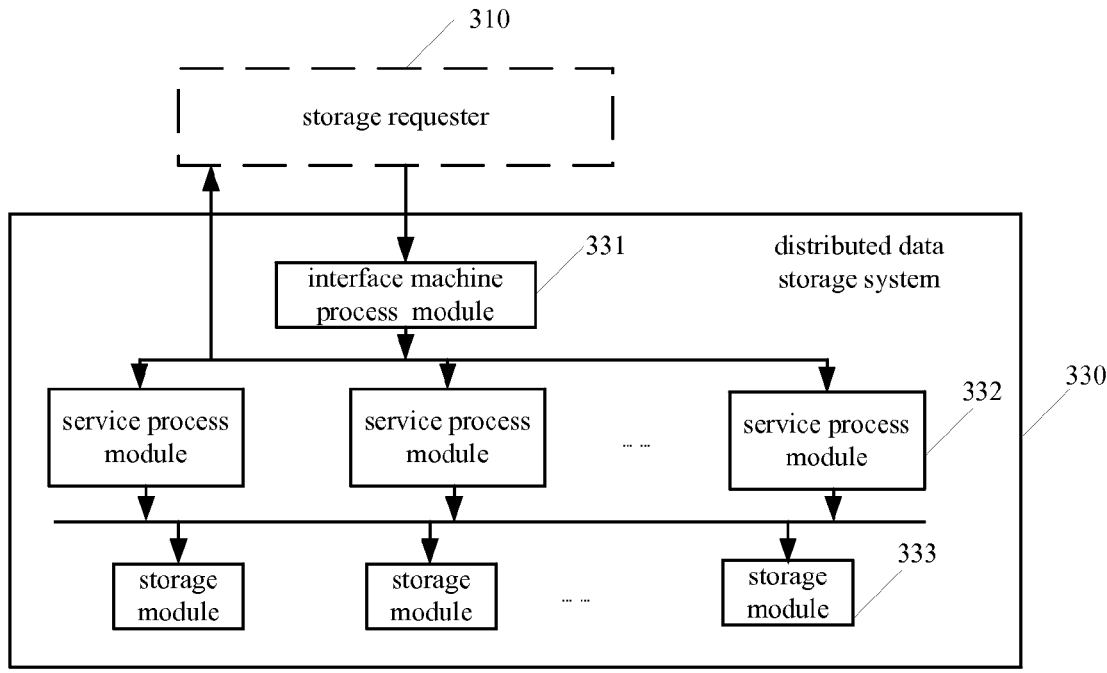
FIG. 3 is a system architecture diagram of a distributed data storage system of one embodiment of the present invention.

FIG. 3 shows a system architecture diagram of a distributed data storage system 330 of one embodiment of the present invention, which includes an interface machine process module 331, at least one service process module 332 and at least one storage module 333.

The interface machine process module 331 is configured to receive a storage request containing data to be stored from a storage requester 310 and distribute the storage request to the service process module 332. The service process module 332 is configured to assign storage identifiers and provide data storage service, the service process module 332 receives the storage request from the interface machine process module 331 and assign a storage identifier for the date contained in the storage request. The storage module 333 is configured to store the data according to the storage identifier assigned by the service process module 332.

In order to avoid storage failure of the distributed data storage system 330 when adding new data, caused by that the service process module 332 cannot receive new data, an usable service process module list can be maintained in the interface machine process module 331. For example, the interface machine process module 331 can maintain the usable service process module list by determining and deleting service process modules 332 which cannot provide new storage services from the usable service process module list. In fact, the interface machine process module 331 can determine whether a service process module 33 is usable and update the usable service process module list through a variety of ways. For example, the interface machine process module 331 can maintain a usable service process module list with a stat of "appendable", the "appendable" state of each service process module listed in this list is effective. The polling mode can be used in the interface machine process module 332 to periodically confirm for each service process module whether its "appendable" state is effective. Alternatively, the service process module 332 can periodically report whether its "appendable" state is effective to the interface machine process module 331. Of course, alternatively, the service process modules 332 which cannot provide new storage services may not be deleted from the usable service process module list, whether the module is usable can be determined according to state of the service process module 332 recorded in the list. The present invention is not limited to the above manner of maintaining the usable service process module list.

When the interface machine process module 331 receives the storage request, the interface machine process module 331 can select one usable service process module 332 from the above usable service process module list, and forwards the storage request to the usable service process module 332. For example, when service process executed by one service process module 332 is hang up, the "appendable" state of this service process module 332 is no longer effective, and the interface machine process module 331 will no longer distribute new requests to this service process module 332 and share equally storage requests to the rest usable service process modules 332, to guarantee the availability of new services. For another example, when one usable service process module 332 has already distributed all the storage identifiers which it is responsible for, the interface machine process module 331 deems that this service process module 332 is no longer usable and will not distribute storage requests to this service process module 332. In addition, when one usable service process module 332 has already distributed the storage identifiers which it is responsible for, its "appendable" state is also no longer effective.

Further, the interface machine process module 331 can select usable service process modules 332 from "appendable" service process module list through a variety of ways.

For example, in order to make the load of each service process module 332 balanced, according to one exemplary embodiment of the present invention, it can further record an identifier of a service process module 332 selected from the usable service process module list in the last time of storing data, and select a usable service process module 332 from the usable service process module list based on the identifier of the service process module 332 selected from the usable service process module list in the last time of storing data. For example, a subscript of a service process module 332 to which the storage request is distributed in the last time is recorded (i.e., which service process module the last storage request is distributed to), thereby realizing successive distribution of new storage requests in all the service process modules 332 of which the "appendable" state is effective, to ensure the load of each service process modules 332 balanced. Further, the interface machine process module 331 can also randomly select a usable service process module 332 from the usable service process module list. The present invention is not limited to the above manner of selecting the usable service process module 332.

Each service process module 332 can be responsible for assignment and data services of storage identifiers of one or some storage identifier segments (or number segment), and each service process module 332 is independent from each other. For example, hundreds of thousands of continuous storage identifiers can be defined as a storage identifier segment, then the calculation formula of the storage identifier segment and the storage identifier can be represented as: UnitID=[ID/100000]+1, where UnitID represents storage identifier segment, ID represents specific storage identifier. For example, storage identifiers from 1 to 99999 belong to the storage identifier segment 1. Three sub-states can be defined for each service process module 332: readable, writable and appendable. "Readable" shows that this service process module 332 can provide data read service; "writable" shows that this service process module 332 can provide data modification service; "appendable" shows that this service process module 332 can provide new data services. The state of the service process module 332 can include any one or any number of combinations of the three sub-states according to actual situations.

Specifically, besides providing functions of the normal reading and writing, the service process module 332 also assigns storage identifiers for the date contained in the storage request according to orders of the storage identifiers or randomly in at least one segment of continuous storage identifiers. For example, the service process module 332 assigns storage identifiers for data in its own responsible segment.

The specific assignment rule can adopt the manner of successive assignment of storage identifiers from small to large. Suppose that hundreds of thousands of continuous storage identifiers is a storage identifier segment, an example of a specific assignment of storage identifiers is given below: suppose that the service process module i is responsible for the storage identifier segments 6 and 8, the first storage identifier released by this process is 500000, the second storage identifier is 500001, by analogy, when 599999 is released, the storage identifiers in the storage identifier segment 6 have been assigned, and the next storage identifier is 700000, by analogy, when all the storage identifiers have been assigned, the service process module i cannot add new data, or in other words, its "appendable" state lose effectiveness.

The storage module 33 can be a variety of computer storage media, such as Solid State Disk (SSD), Hard Disk Drive (HDD) and so on. Those skilled in the art know how the storage module 333 stores data according to storage identifiers, thus, the specific technical details are not described here.

Further, as another embodiment of the present invention, the service process module 332 can further be configured to, after the data is stored in the storage module 333, respond a successful response message to the storage requester 310, and the successful response message contains the storage identifier assigned to the data.

As still another embodiment of the present invention, the interface machine process module 331 can further receive a read request containing a storage identifier from the storage requester 310, and forward the read request to the service process module 332 which assigns the storage identifier before according to the storage identifier contained in the storage request, the service process module 332 instructs the storage module 333 to return the data stored in the storage module 333 to the storage requester 310, according to the storage identifier contained in the read request.

As still another embodiment of the present invention, the interface machine process module 331 can further receive a write request containing a storage identifier and content to be modified from the storage requester 310, and forward the write request to the service process module 332 which assigns the storage identifier before according to the storage identifier contained in the write request, the service process module 332 instructs the storage module 333 to modify the data stored in the storage module 333 according to the storage identifier contained in the write request.

In the above solution, although FIG. 3 only shows one interface machine process module 331, the present invention is not limited to this. As another embodiment of the present invention, the distributed data storage system can also include a plurality of interface machine process modules 331. The plurality of interface machine process modules 331 can work together to complete receiving and distribution of storage requests. For example, the plurality of interface machine process modules 331 can adopt the disaster recovery design, and can also respectively responsible for distributing storage requests to a portion of usable service process modules 332, or collaboratively distribute storage requests to all the usable service process modules 332, to increase reliability and flexibility of the system.

Moreover, FIG. 3 only schematically shows logical connections between the above various modules of the distributed storage system of one embodiment of the present invention, in fact, the above modules can be located in the same or different physical computer or network system. One service process module 332 can store data in one or more storage modules 333, and one storage module 333 can also receive data distributed from multiple service process modules 332.

It should also be noted, the storage requester 310 can be a party which is of various forms and needs data services, for example, it can be device or system which sends data service request, such as network, server pr client and so on. When reading data, the storage requester 310 can also be called as read requester while when writing data, the storage requester 310 can also be called as writing requester FIG. 4 is a schematic flow chart of a distributed data storage method of one embodiment of the present invention.

Figure 4:
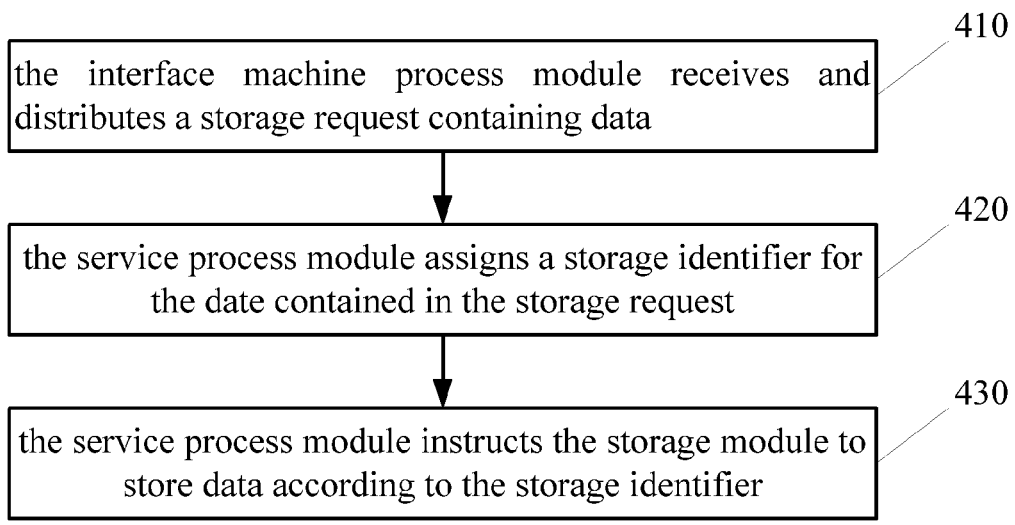
FIG. 4 is a schematic flow chart of a distributed data storage method of one embodiment of the present invention.

Referring to FIG. 4, it includes following steps:

S410: an interface machine process module receives a storage request from a storage requester and distributes the storage request to one of at least one service process module; the storage request contains data to be stored.

S420: the service process module receives the storage request from the interface machine process module and assigns a storage identifier for the date contained in the storage request.

S430: the at least one storage module stores the data according to the storage identifier assigned by the service process module In the embodiment of the present invention, the interface machine process module can use a variety of ways to distribute the storage request to the service process module, and the service process module can also use a variety of ways to assign storage identifiers. This is hereinafter described in detail with reference to the specific exemplary embodiments.

Figure 5:
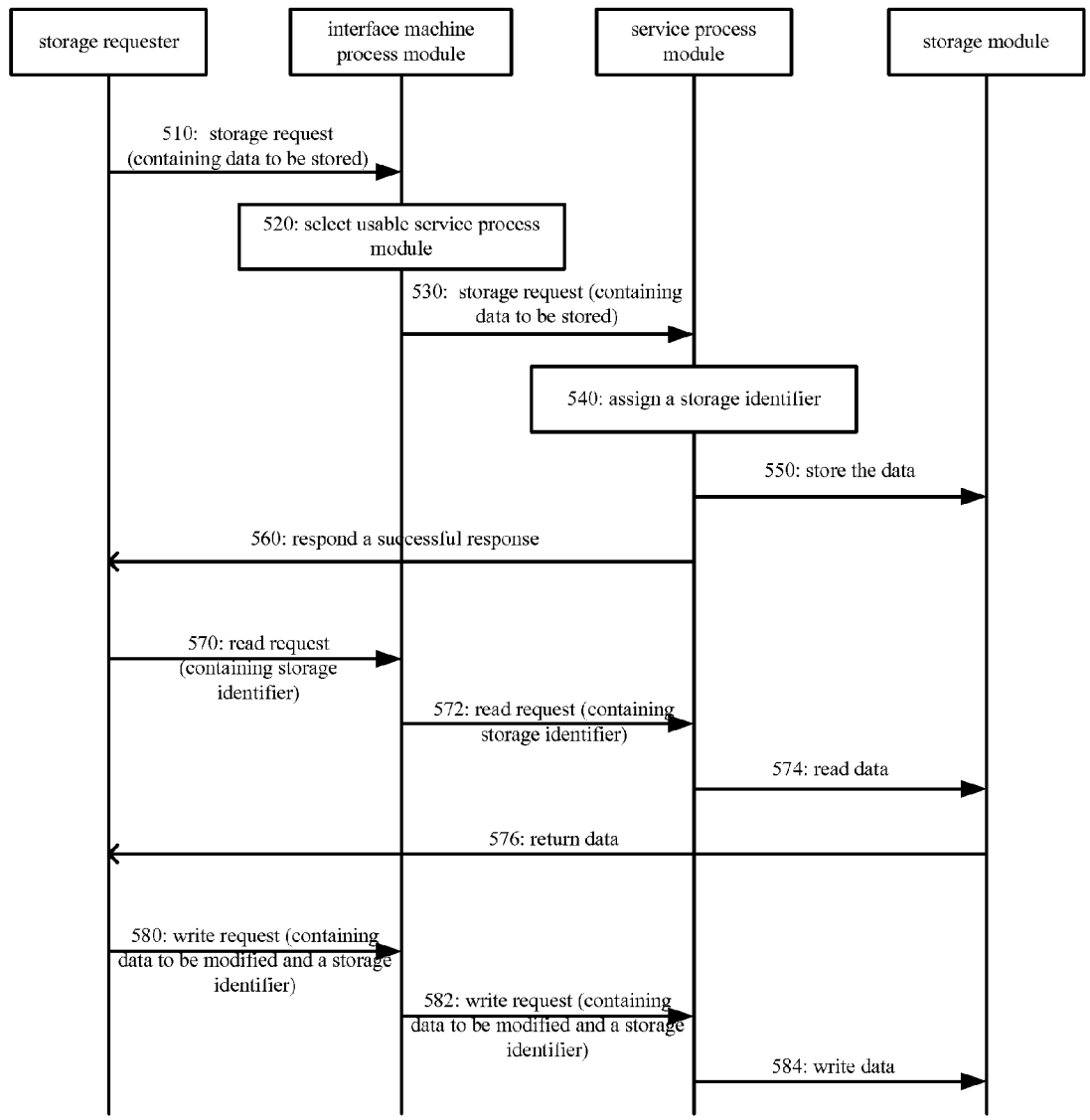
FIG. 5 is an exemplary flow chart of a distributed data storage method of another embodiment of the present invention.

FIG. 5 is an exemplary flow char of a distributed data storage method of another embodiment of the present invention.

Figure 1:
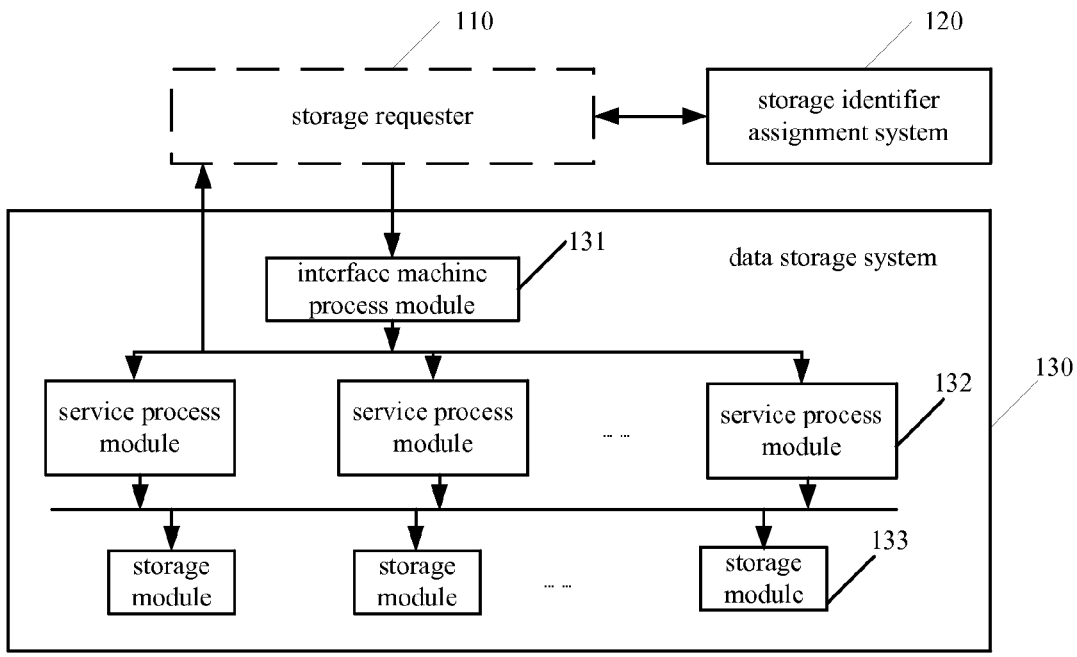
FIG. 1 is a system architecture diagram of an existing distributed data storage system.
Figure 2:
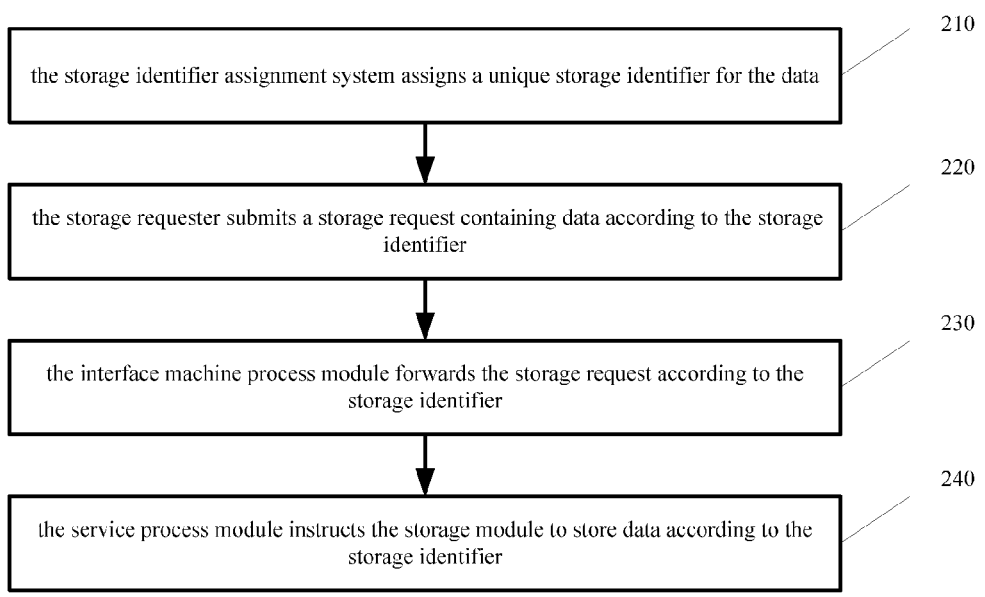
FIG. 2 is a schematic flow chart of an existing distributed data storage method.

Referring to FIG. 5, it includes following steps:

S510: an interface machine process module receives a storage request containing data to be stored from a storage requester. The realization of the storage request is similar to the storage request shown in FIG. 2, the difference is that this storage request does not contain storage identifiers.

S520: the interface machine process module selects one usable service process module from the usable service process module list. As what is described in the above embodiment of the distributed data storage system, the interface machine process module can maintain the usable service process module list by a variety of ways. For example, the usable service process module list can be maintained by determining and deleting service process modules which cannot provide new storage services from the usable service process module list. Further, the interface machine process module can record an identifier of a service process module selected from the usable service process module list in the last time of storing data, and select a service process module which can be used to distribute the current storage request from the usable service process module list based on the identifier of the service process module selected from the usable service process module list in the last time of storing data. Further, the interface machine process module can also randomly select a usable service process module from the usable service process module list. The flow chart of a specific method for selecting usable service process module according to one embodiment of the present invention refers to the description of the FIGS. 6 and 7.

S530: the interface machine process module forwards the storage request to the selected usable service process module.

S540: the selected usable service process module assigns a storage identifier for the data contained in the storage request. The service process module can assign storage identifiers for the date contained in the storage request according to orders of the storage identifiers or randomly in at least one segment of continuous storage identifiers. The specific assignment method refers to the description about the assignment of the storage identifiers in the system embodiment of the present invention.

S550: the storage module stores the data according to the storage identifier assigned by the service process module. Those skilled in the art can know how to store data according to storage identifiers, and it will not be described here.

The forgoing is the basic process to implement the distributed storage method according to one embodiment of the present invention. In order to improve data storage, read/write services, according to another embodiment of the present invention, the following steps can be further included:

S560: the service process module responds a successful response message to the storage requester, after the data is stored in the storage module. The successful response message contains information which can tell the storage request that the date has been successfully stored, and can also include the storage identifier to be used for future read and write data.

When reading data, the following steps can further be included:

S570: the interface machine process module receives a read request containing a storage identifier from the storage requester.

S572: the interface machine process module forwards the read request to the service process module which assigns the storage identifier before according to the storage identifier contained in the storage request.

S574: the interface machine process module reads the data from the storage module according to the storage identifier contained in the read request S576: the storage module returns the data to the storage requester according to the storage identifier.

When writing data, the following steps can further be included:

S580: the interface machine process module receives a write request containing a storage identifier and data to be modified from the storage requester.

S582: the interface machine process module forwards the write request to the service process module which assigns the storage identifier before according to the storage identifier contained in the storage request.

S584: the service process module writes data into the storage module according to the storage identifier and content to be modified contained in the read request, so that the storage module can modify the data stored in the storage module.

Figure 6:
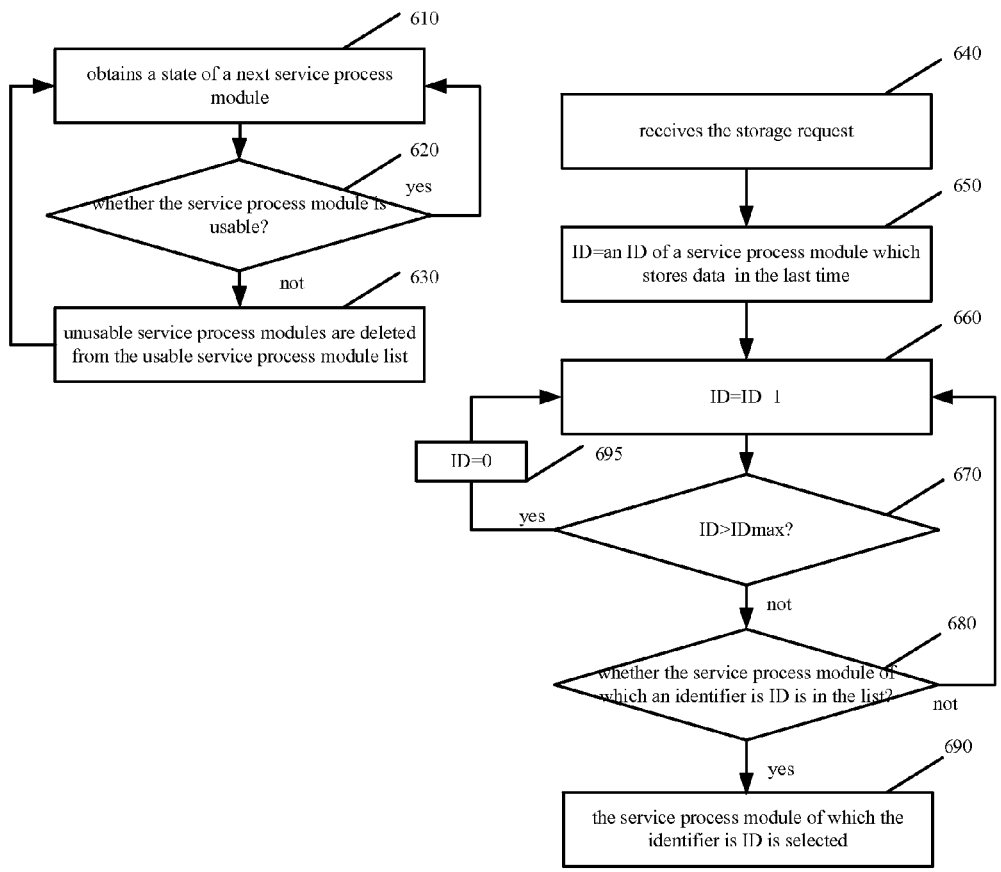
FIG. 6 is an exemplary flow chart of a method for selecting usable service process module of one embodiment of the present invention.

FIG. 6 is an exemplary flow chart of a method for selecting usable service process module of one embodiment of the present invention.

Referring to FIG. 6, it includes following steps:

S610: the interface machine process module obtains a state of a next service process module. The interface machine process module can circularly inquire a state of each service process module at a certain period according to the sequence of identifiers of the service process modules. The current state of each service process module can also be reported to the interface machine process module by each service process module.

S620: the interface machine process module determines whether the service process module is usable? For example, whether new data can be appended? If yes, then the step S610 is performed to continue to inquire whether a next service process module is usable. If not, then the step S630 is performed.

S630: unusable service process modules are deleted from the usable service process module list.

The step S610 to the step S630 can be periodically performed to maintain the usable service process module list, to ensure that service process modules in the usable service process module list are usable, or in other words, new data can be appended.

Further, when the storage requester issues the storage request, the interface machine process module can perform the following steps:

S640: the interface machine process module receives the storage request from a data requester.

S650: the interface machine process module assigns value to a variable ID to make it equal to an identifier (ID) of a service process module which provides data storage service in the last time. For example, continuous ID can be assigned to the service process modules, such as the natural number 1 to n, in this case, when the data storage is performed for the first time, then an ID of a service process module which stores data storage service in the last time is 0.

S660: making ID=ID+1. The purpose of performing this step is to be able to select available services process modules in order.

S670: if ID>IDmax, then the step S695 is performed, otherwise, the Step 60 is continued to be performed. Here, IDmax represents an ID of a service process module with the maximum ID of the service process modules.

S680: the interface machine process module determines whether the service process module of which an identifier is ID is in the list? if the service process module of which the identifier is ID is not in the list, then the step S660 is performed to continue to inquire whether a next service process module (of which an identifier is ID+1) is in the list. If the service process module of which the identifier is ID is in the list, then, the step S690 proceeds to be performed.

S690: the service process module of which the identifier is ID is selected as a service process module to receive the storage request.

Step S695: making ID=0 and performing the step S660. If the identifier variable ID>IDmax, it shows that the interface machine process module has completed a round of distribution of storage requests to the service process modules with identifiers from 1 to n, thus, a next round of distribution of storage requests to the service process modules with identifiers from 1 to n can be started.

The above method for selecting service process modules can ensure that the loads of the various service process modules are balanced, but the method for selecting service process modules of the present invention is not limited to this.

Figure 7:
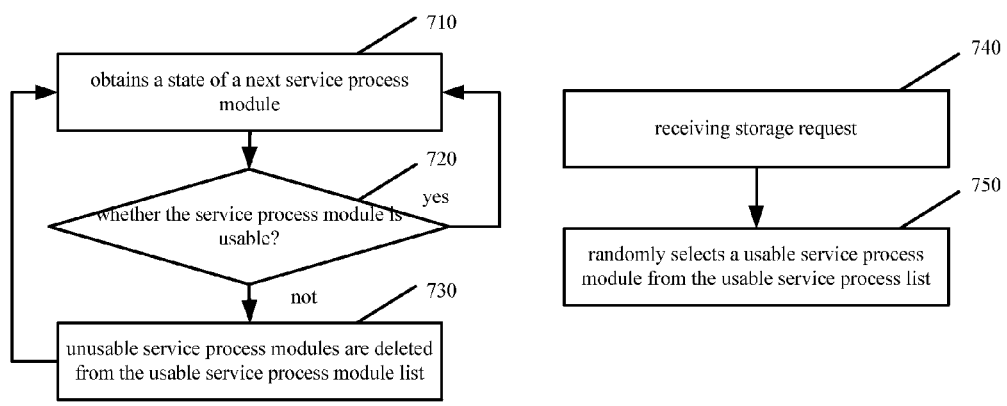
FIG. 7 is an exemplary flow chart of a method for selecting usable service process module of another embodiment of the present invention.

FIG. 7 is an exemplary flow chart of a method for selecting usable service process module of another embodiment of the present invention.

Referring to FIG. 7, it includes following steps:

S710: the interface machine process module obtains a state of a next service process module.

S720: the interface machine process module determines whether the service process module is usable? For example, whether new data can be appended? If yes, then the step S710 is performed to continue to inquire whether a next service process module is usable. If not, then the step S730 is performed.

S730: unusable service process modules are deleted from the usable service process module list.

The step S710 to the step S730 are similar to the step S610 to the step S630, and can be periodically performed to maintain the usable service process module list, to ensure that service process modules in the usable service process module list are usable, or in other words, new data can be appended.

Further, when the storage requester issues the storage request, the interface machine process module can perform the following steps:

S740: the interface machine process module receives the storage request from a data requester.

S750: the interface machine process module randomly selects a usable service process module from the usable service process module list.

In addition, when there is a plurality of interface machine process modules, each interface machine process module can also work with other interface machine process modules to receive and distribute storage requests. The plurality of interface machine process modules can adopt the disaster recovery design, and can also be respectively responsible for maintain a portion of the usable service process module list, or collaboratively maintain the same usable service process module list, to increase reliability and flexibility of the system.

The distributed data storage solution adopted in the above embodiments of the present invention no longer uses the special storage identifier assignment system, so, the distributed data storage system no longer has external dependent modules and is completely decoupled, thereby avoiding that the whole distributed storage system cannot work normally due to failure of the storage identifier assignment system.

Further, the following advantages can be obtained by application of the solution of the distributed data storage system or method: 1) since the special storage identifier assignment system is no longer used and then it also is no longer needed to make disaster recovery design for the special storage identifier assignment system, thus, the design is simple; 2) since there is no coupling with the special storage identifier assignment system and the design is simple, thus, the operation and maintenance cost can be reduced; 3) since new storage request can be distributed to only the usable service process modules, thus, the problem of single point of failure of the service process modules does not exist; and 4) since the interaction with the storage identifier assignment system is no longer performed, thus, the bandwidth cost can be reduced.

The foregoing are only preferred embodiments of the present invention, and are not used to limit the present invention. Any modification, equivalent replacement, or improvement made without departing from the spirit and principle of the present invention should fall within the scope of the present invention.

The invention claimed is:

1. A distributed data storage system comprising:
   a computer processor;
   an interface machine process module, at least one service process module and at least one storage module;
   the interface machine process module is configured to receive a storage request containing data to be stored from a storage requester and distribute the storage request to one of the at least one service process module, wherein the one of the at least one service process module is randomly selected from a usable service process module list for distribution maintained by the interface machine process module;
   the one of the at least one service process module is configured to receive the storage request from the interface machine process module and assign a storage identifier for the date contained in the storage request, wherein the one of the at least one service process module assigns the storage identifier according to orders of storage identifiers or randomly in at least one segment of continuous storage identifiers;

the at least one storage module is configured to store the data according to the storage identifier assigned by the one of the at least one service process module;

wherein the interface machine process module maintains the usable service process module list by determining and deleting service process modules which are unable to provide new storage services from the usable service process module list.

2. The system according to claim 1, wherein the interface machine process module is further configured to record an identifier of a service process module selected from the usable service process module list in the last time of storing data, and select one of the at least one service process module from the usable service process module list based on the identifier.

3. The system according to claim 1, wherein the interface machine process module is configured to respond a successful response to the storage requester after the at least one storage module stores the data according to the storage identifier assigned by the service process module, and the successful response contains the storage identifier.

4. The system according to claim 3, wherein the interface machine process module is further configured to receive a read request containing the storage identifier from the storage requester, and forward the read request to one of the at least one service process module according to the storage identifier contained in the storage request, the one of the at least one service process module instructs the at least one storage module to return the stored data to the storage requester according to the storage identifier contained in the read request.

5. The system according to claim 3, wherein the interface machine process module is further configured to receive a write request containing the storage identifier and content to be modified from the storage requester, and forward the write request to one of the at least one service process module according to the storage identifier contained in the write request, the one of the at least one service process module instructs the at least one storage module to modify the stored data according to the storage identifier and the content to be modified contained in the write request.

6. The system according to claim 1, wherein the system further comprises another interface machine process module which is configured to work together with the interface machine process module to receive and distribute the storage request.

7. A distributed data storage method comprising:

receiving, by an interface machine process module, a storage request containing data to be stored from a storage requester, and distributing, by the interface machine process module, the storage request containing data to be stored;

selecting one of the at least one service process module from a usable service process module list, and forwarding the storage request to the selected service process module, wherein the one of the at least one service process module is randomly selected from the usable service process module list for distribution maintained by the interface machine process module;

receiving, by the one of the at least one service process module, the storage request from the interface machine process module, and assigning, by the one of the at least one service process module, a storage identifier for the date contained in the storage request according to orders of storage identifiers or randomly in at least one segment of continuous storage identifiers;

storing, by at least one storage module, the data according to the storage identifier assigned by the one of the at least one service process module;

wherein the interface machine process module maintains the usable service process module list by determining and deleting service process modules which are unable to provide new storage services from the usable service process module list.

8. The method according to claim 7, wherein the method further comprises:

the interface machine process module records an identifier of a service process module selected from the usable service process module list in the last time of storing data;

the selecting the one of the at least one service process module from the usable service process module list comprises:

selecting one of the at least one service process module from the usable service process module list based on the identifier of the service process module selected from the usable service process module list in the last time of storing data.

9. The method according to claim 7, wherein the method further comprises:

the one of the at least one server process module responds a successful response to the storage requester after the data is stored in the at least one storage module, and the successful response contains the storage identifier.

10. The method according to claim 9, wherein the method further comprises:

the interface machine process module receives a read request containing the storage identifier from the storage requester, and forward the read request to one of the at least one service process module according to the storage identifier contained in the read request;

the one of the at least one service process module instructs the at least one storage module to return data corresponding to the storage identifier contained in the read request to the storage requester according to the storage identifier contained in the read request.

11. The method according to claim 9, wherein the method further comprises:

the interface machine process module receives a write request containing the storage identifier and content to be modified from the storage requester, and forwards the write request to one of the at least one service process module according to the storage identifier contained in the write request;

the one of the at least one service process module instructs the at least one storage module to modify data corresponding to the storage identifier contained in the write request according to the storage identifier and the content to be modified contained in the write request.

12. The method according to claim 7, wherein the method further comprises:

the interface machine process module and another interface machine process module work together to receive and distribute the storage request.

* * * * *